Figure 1:
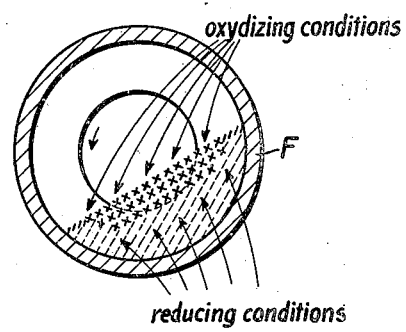

July 14, 1936.   F. JOHANNSEN   2,047,562

PROCESS OF PRODUCING WROUGHT IRON

Filed Nov. 7, 1935

INVENTOR
Friedrich Johannsen
by Karl Viertel
ATTORNEY.

Patented July 14, 1936

2,047,562

UNITED STATES PATENT OFFICE 2,047,562

PROCESS OF PRODUCING WROUGHT IRON

Friedrich Johannsen, Magdeburg, Germany, assignor to firm Fried. Krupp Grusonwerk Aktiengesellschaft, Magdeburg-Buckau, Germany Application November 7, 1935, Serial No. 48,689
In Germany August 25, 1934

3 Claims. (Cl. 75—32)

My invention relates to the problem of directly producing wrought iron from ferriferous minerals and metallurgical products,—and more especially to improvements in a process of directly and continuously producing lumped wrought iron in a metallurgical furnace, as described in a prior United States patent of mine No. 1,964,917 of July 3, 1934, hereinafter referred to as the "old" process.

The objects of this invention and the advantages obtained by the proposed improvements will be better understood by critically reviewing the old process and gathering the reasons why the old process was unsatisfactory from economical points of view.

The old process of directly producing lumped wrought iron is carried out in practice preferably in a rotary metallurgical furnace of tubular design and essentially comprises the following steps: Causing a charge of ferriferous material, which is mixed with carbonaceous reducing agents, for instance fuel in the form of ground coke, to pass through the heated furnace so as to be converted at temperatures ranging from 600–900 centigrades into iron sponge,—causing the charge to be further heated up to still higher temperatures, at which the iron sponge is about to lump, ranging from about 900 to 1400 centigrades,—causing a current of oxidizing gases to react with the heated charge, so as to oxidize i. e. burn a portion of iron of the sponge and produce additional heat, sufficient for starting and accomplishing the lumping of the iron of the sponge and for producing from the iron oxides and the slag forming constituents of the ore, which are fluxible by iron-oxide, slags rich in iron oxides and sufficiently liquid as to flow out of the lumping iron,—causing iron oxides of said slags to be reconverted into lumped wrought iron, by so determining the quantity of fuel added to the charge, that a sufficient proportion of unconsumed fuel is still present in the charge on passing through the lumping zone and to the exit of the furnace, for reducing in one and the same cycle of reactions iron oxides of said slags,— and causing said slags and lumped iron embedded therein to flow from the furnace.

Continued practical experiments of mine and other efforts directed to carrying out the old process described under conditions of strictest economy, viz. with the object of economizing in the consumption of fuel and reclaiming the greatest possible proportion of iron from the raw material under treatment and in the shortest possible time have revealed, that certain procedures and features characteristic of the old process were unsatisfactory.

As a matter of fact by using for reaction with the heated iron sponge in the lumping zone air, viz. a gaseous oxidizing agent, which is highly diluted with nitrogen, the efficiency of the process is curtailed, because incidentally introducing into the furnace nitrogen together with the oxygen of the air means heating up uselessly ballast matter, or waste gases, which escape through the stack.

Another disadvantage connected therewith, which accrues from using air—a gaseous medium diluted with nitrogen—as oxidizing agent lies therein, that the progress of the lumping process proper is altogether relatively slow, since the oxidizing reaction occurs only within a limited area and exclusively at the surface of the charge,— and because the additional heat, which must be generated is sometimes inadequate for producing those thinly liquid slags desired and at such a rate as required for the timely lumping of all the iron in the charge.

The principal object of this invention is to overcome the aforesaid drawbacks inherent to the old lumping process concerned.

Other objects aimed at and advantages obtained will become incidentally apparent hereinafter to experts in the metallurgical field.

Figure 2:
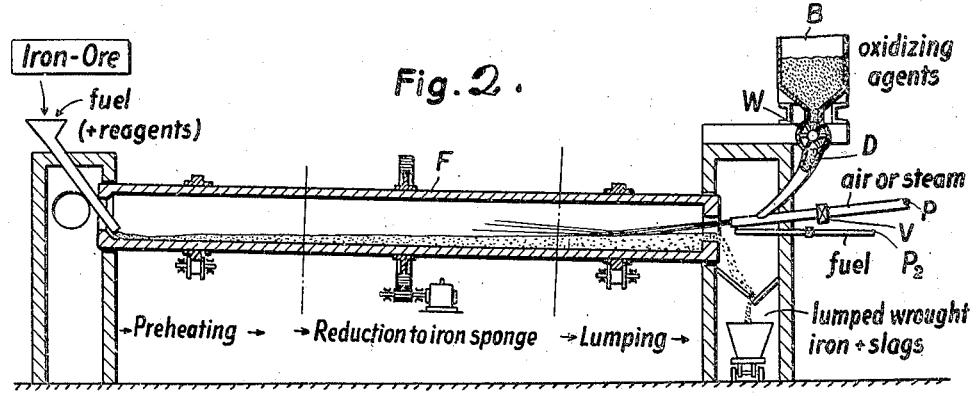

The nature and scope of this invention are briefly outlined in the appended claims and will be more fully understood from the following specification taken together with the accompanying drawing, in which Fig. 1 is a cross section vertically taken through the lumping zone of a metallurgical furnace, which works according to this invention;

Fig. 2 is a longitudinal section taken vertically through a metallurgical furnace redesigned and fitted for the purposes of this invention with means for throwing thereinto comminuted solid oxidizing agents for reaction with the heated charge in the lumping zone.

As the result of continued research work and practical experiments of mine directed to materially improving the old process with the objects briefly outlined above it has been found, that for reaction with the heated iron sponge in the lumping zone of the furnace—in addition to air or instead of air—solid oxidizing agents can be used to advantage, namely minerals and like substances containing oxygen or oxygenic compounds, which either directly give off oxygen, or which under the conditions prevailing in the lumping zone produce carbon dioxide, which in turn is decomposed into carbon monoxide and oxygen.

Ferriferous ores of oxygenic nature and iron carbonates, including brown iron ore (limonite), red iron ore (hematite), spathic iron ore (siderite) and magnetic iron ore (magnetite) have proved to be suitable oxidizing agents, their decomposition and reactions with the heated sponge iron—hereinafter symbolized "Fe"—assumably proceeding substantially according to the following equations:

Limonite
$$\begin{cases} 2Fe_2O_3.3H_2O = 2Fe_2O_3 + 3H_2O \\ 2Fe_2O_3 + Fe = 3FeO \\ 3H_2O = 3H_2 + 3O \\ 3Fe + 3O = 3FeO \end{cases}$$

Hematite $Fe_2O_3 + Fe = 3FeO$

Siderite
$$\begin{cases} FeCO_3 = FeO + CO_2 \\ CO_2 = CO + O \\ Fe + O = FeO \end{cases}$$

Magnetite $Fe_3O_4 + Fe = 4FeO$

Another list of minerals, which were tested and found suitable for the purposes of this invention includes carbonates of the alkaline-earth metals including limestone $CaCO_3$, magnesite $MgCO_3$, dolomite $CaMg(CO_3)_2$ (calcium magnesium carbonate), also carbonates and acid carbonates of the alkali metals, including $Na_2CO_3$, $K_2CO_3$, $NaHCO_3$, $KHCO_3$; the oxidizing effect of those minerals depending assumably upon decompositions and reactions set forth in the following equations:

$$CaCO_3 = CaO + CO_2$$
$$CO_2 + Fe = FeO + CO$$

$$MgCO_3 = MgO + CO_2$$
$$CO_2 + Fe = FeO + CO$$

$$CaMg(CO_3)_2 = CaO + MgO + 2CO_2$$
$$2CO_2 + 2Fe = 2FeO + 2CO$$

$$Na_2CO_3 = Na_2O + CO_2$$
$$CO_2 + Fe = FeO + CO$$

$$K_2CO_3 = K_2O + CO_2$$
$$CO_2 + Fe = FeO + CO$$

$$2NaHCO_3 = Na_2O + H_2O + 2CO_2$$
$$2H_2O = 2H_2 + O_2$$
$$2Fe + O_2 = 2FeO$$
$$2CO_2 + 2Fe = 2FeO + 2CO$$

$$2KHCO_3 = K_2O + H_2O + 2CO_2$$
$$2H_2O = 2H_2 + O_2$$
$$2Fe + O_2 = 2FeO$$
$$2CO_2 + 2Fe = 2FeO + 2CO$$

My observation and numerous tests made in the course of lumping processes carried out with the employment of different minerals listed above as oxidizing agents have proved, that the oxidation of the iron in the lumping zone of the furnace is not only materially intensified at the surface of the charge, but is also propagated and carried forward by reason of the trundling motion of the charge into a relatively thick layer beneath the surface, as indicated at $x$—$x$—$x$ in Fig. 2.

As to the employment of water containing minerals as oxidizing agents such as brown iron ore and alkali-acid carbonates I attribute the good results obtained therewith to a decomposition of the water by the heat and the concurrent liberation of oxygen in the lumping zone, which in turn enhances the oxidizing action.

It has further been found, that by the employment of limestone, of alkali carbonates and of alkali acid carbonates as oxidizing agents the sulfur content of the lumped iron is materially reduced as compared with the average sulfur content of the lumped iron produced by the old process, in which air alone is used as oxidizing agent. I attribute this phenomenon to the desulphurizing action of calcium and alkalies, which is known in other metallurgical fields, and is supposed to be due to reactions proceeding according to the following equations:

$$CaO + FeS = CaS + FeO$$
$$Na_2O + FeS = Na_2S + FeO$$
$$K_2O + FeS = K_2S + FeO$$

A certain desulphurizing effect may be attributed to the presence of water or rather steam given off or produced by those minerals, used as oxidizing agents, in which water is either chemically bound in the form of water of crystallization, or which contain water as humidity; assumably the said desulphurizing effect is accompanied by reactions and decompositions occurring according to the following equations:

$$2NaHCO_3 = Na_2O + H_2O + 2CO_2$$
$$2H_2O = 2H_2 + O_2$$
$$H_2 + FeS = H_2S + Fe$$

$$2KHCO_3 = K_2O + H_2O + 2CO_2$$
$$2H_2O = 2H_2 + O_2$$
$$H_2 + FeS = Fe + H_2S$$

In Fig. 3 of the drawing a rotary metallurgical furnace F' is shown by way of an example, which is fitted according to this invention with dispensing and feeding means adapted to feed the solid oxidizing agents concerned in appropriate proportions and preferably in finely subdivided form into the lumping zone of the furnace.

Said dispensing and feeding means comprise: A bin B containing the solid reagents concerned, a rotary dispensing wheel W of known design enclosed in a shell and having a number of cells; means known per se and not shown,—which are under the control of the operator and are provided for controlling the revolving speed of said dispensing wheel W with the object of adjusting according to temporary requirements the quantity of the solid oxidizing agents introduced into the furnace; a source of compressed air, supplied through pipe P, for blowing the oxidizing agents concerned, which slide down through duct D, into the furnace F.

Another pipe P2 is provided for feeding pulverulent, liquid or gaseous fuel into the furnace as required on starting the furnace to work or for temporarily supplying additional heat—thus enabling the operator of the plant to cope with adverse circumstances, for instance, if the heat produced in the furnace drops below the normal temperatures, at which the lumping of the iron occurs.

According to my observations in the majority of cases it is advisable to control the volume of compressed air supplied through pipe P and passing through cut-off valve V in such manner as to be just sufficient for blowing a requisite quantity of the solid oxidizing agents in finely subdivided form into the furnace F.

Obviously the furnace F can be worked also exactly as previously proposed in my United States Patent No. 1,964,917, namely with air alone as oxidizing agent, by eliminating the dispensing device W and blowing or drawing a correspondingly larger volume of air into the furnace.

Other changes and modifications may be conveniently made in the manner proposed above of operating metallurgical furnaces for the direct production of lumped wrought iron, without substantially deviating from the improved process described hereinbefore, and without departing from the spirit of this invention.

For instance instead of compressed air steam may be used to advantage as gaseous medium for blowing the solid oxidizing agents into the furnace—particularly in cases, where the ferriferous raw material under treatment or the solid oxidizing agents, or both, have a high sulphur content; steam seems to have also a desulphurizing effect upon the lumped iron, which I attribute to a chemical decomposition of the steam and the incidental production of hydrogen sulphide in the lumping zone.

Obviously the process modified and improved according to this invention, which is preferably carried out in a continuous manner, can be started and carried out in one and the same furnace either with sponge iron or with ferriferous ores as the initial or basic raw material as indicated in Fig. 3.

Instead of simply directing the above described process to the production of lumped wrought iron from plain iron ores the improved process may be used in analogy to the teaching of my United States Patent 2,026,683, for separating from iron ores and kindred materials, distinct by their content of iron-like companion metals, which however are reducible at higher temperatures than iron, viz. chromium, manganese, molybdenum, titanium, tungsten and vanadium—the said companion metals.

In this case lumps of wrought iron are obtained which are embedded in slags, the latter being relatively poor in iron but containing practically all the bulk of the companion metal concerned, which is then still in unreduced condition and must be reclaimed therefrom by subsequent treatment.

Likewise the process improved according to this invention may be conveniently directed in analogy to the teaching of my United States patent application Ser. No. 751,094, filed November 1, 1934, to the production of lumped iron alloys, containing non-ferrous metals such as nickel, cobalt, which form alloys with the iron below the melting point of the respective alloys, and which can be reduced in practice under about the same conditions, particularly like temperatures, at which the iron is reduced.

In the latter case lumps of ferro-nickel or another specific iron alloy containing the respective non-ferrous metal, are obtained embedded in slags, from which the said lumps are to be subsequently separated and are then ready for the production of special alloyed steels.

It should be understood that the terms wrought iron and lumped iron used in the following claims include also wrought iron alloyed with the non-ferrous metals concerned.

What I claim is:

1. Process of producing wrought iron which comprises: causing a charge of sponge iron mixed with carbonaceous fuel to pass through a metallurgical furnace, agitating the charge therein and heating it up to temperatures, at which the sponge iron is about to lump, causing solid oxidizing agents to be thrown upon the heated sponge iron for reaction therewith, whereby a proportion of the iron is burnt and additional heat is produced, sufficient for starting and accomplishing the lumping of the iron and for producing from the iron oxides and the slag forming constituents of the charge, which are fluxible by iron oxide, slags rich in iron oxides and sufficiently liquid as to flow out of the lumping iron, causing iron oxides from said slags to be re-converted into lumped wrought iron by so determining the quantity of fuel, added to the sponge iron, that a sufficient proportion of unconsumed fuel is present in the charge on passing through the lumping zone for reducing in one and the same cycle of reactions iron oxides of said slags, and causing said slags and lumped iron embedded therein to flow from the furnace.

2. Process of producing wrought iron which comprises: causing a charge of sponge iron mixed with carbonaceous fuel to pass through a metallurgical furnace, agitating the charge therein and heating it up to temperatures, at which the sponge iron is about to lump,—causing a current of oxidizing gases carrying with them solid oxidizing agents to impinge upon the heated charge for reaction therewith, whereby a proportion of the iron is burnt and additional heat is produced, sufficient for starting and accomplishing the lumping of the iron and for producing from the iron oxides and the slag forming constituents of the charge, which are fluxible by iron oxide, slags rich in iron oxides and sufficiently liquid as to flow out of the lumping iron, causing iron oxides from said slags to be re-converted into lumped wrought iron by so determining the quantity of fuel, added to the sponge iron, that a sufficient proportion of unconsumed fuel is present in the charge on passing through the lumping zone for reducing in one and the same cycle of reactions iron oxides of said slags, and causing said slags and lumped iron embedded therein to flow from the furnace.

3. Process of producing wrought iron which comprises: causing a charge of sponge iron mixed with carbonaceous fuel to pass through a metallurgical furnace, agitating the charge therein and heating it up to temperatures at, which the sponge iron is about to lump, causing a jet of steam carrying with it solid oxidizing agents to impinge upon the heated charge for reaction therewith, whereby a proportion of the iron is burnt and additional heat is produced, sufficient for starting and accomplishing the lumping of the iron and for producing from the iron oxides and the slag forming constituents of the charge, which are fluxible by iron oxide, slags rich in iron oxides and sufficiently liquid as to flow out of the lumping iron, causing iron oxides from said slags to be re-converted into lumped wrought iron by so determining the quantity of fuel, added to the sponge iron, that a sufficient proportion of unconsumed fuel is present in the charge on passing through the lumping zone for reducing in one and the same cycle of reactions iron oxides of said slags, and causing said slags and lumped iron embedded therein to flow from the furnace.

FRIEDRICH JOHANNSEN.